United States Patent [19]

Salgues et al.

[11] Patent Number: 4,945,416

[45] Date of Patent: Jul. 31, 1990

[54] ULTRA-RAPID ELECTRONIC CAMERA

[75] Inventors: Pierre Salgues, Massy; Roger Verrecchia, Lesigny, both of France

[73] Assignee: Commissariat a l'Energie Atomique, France

[21] Appl. No.: 312,606

[22] Filed: Feb. 17, 1989

[30] Foreign Application Priority Data

Feb. 17, 1988 [FR] France ........ 88 01867

[51] Int. Cl.[5] ........ H04N 5/30

[52] U.S. Cl. ........ 358/209; 358/217

[58] Field of Search ........ 358/217–219, 358/209, 211; 250/213 VT

[56] References Cited

U.S. PATENT DOCUMENTS

| | | | |
|---|---|---|---|
| 4,012,657 | 3/1977 | Loty | 250/213 VT |
| 4,243,878 | 1/1981 | Kalibjian | 250/213 VT |
| 4,431,914 | 2/1984 | Movrov et al. | 250/213 VT |
| 4,471,378 | 9/1984 | Ng | 358/217 |
| 4,704,634 | 11/1987 | Kato et al. | 358/217 |
| 4,727,427 | 2/1988 | Kime | 358/217 |
| 4,767,207 | 8/1988 | Takiguchi | 250/213 VT |
| 4,837,631 | 6/1989 | Hicks, Jr. | 358/217 |

FOREIGN PATENT DOCUMENTS

| | | |
|---|---|---|
| 0155890 | 9/1985 | European Pat. Off. . |
| 2172991 | 10/1986 | United Kingdom . |

*Primary Examiner*—Stephen Brinich
*Attorney, Agent, or Firm*—Hayes, Soloway, Hennessey & Hage

[57] ABSTRACT

This invention is an ultra rapid digitally controlled electronic camera. It comprises a bilamellar optical image conversion tube having a photocathode, a narrow aperture for receiving photons from the object to be studied, a pair of electron accelerating electrodes, a quadrupolar spatial focusing lens, a temporal focusing lens and means for recording the image of the aperture to a screen. The camera also has electrical supply sources for the lenses and electrodes. The invention also has a pair of prefocusing temporal electrodes connected to an adjustable voltage source, a pair of acceleration electrodes parallel to the aperture, and two deflection plates connected to adjustable voltage sources. The camera has a control unit distant from the tube to control the regulation and measurement means for the source voltages situated near the tube. Its application is for the study of very rapid light phenomena.

3 Claims, 3 Drawing Sheets

PRIOR ART

ULTRA-RAPID ELECTRONIC CAMERA

BACKGROUND OF THE INVENTION

1. Field of the Invention

The present invention concerns an ultra-rapid digitally controlled electronic camera for the study of extremely brief light phenomena.

Said camera is used to record images of extremely short duration, to record a profile of the evolution in time of extremely brief light phenomena. The camera is particularly applicable to ballistics, explosives, the study of living cells, laser experiments, etc.

An ultra rapid electronic camera with a scanning aperture for studying light phenomena is already known, utilizing a bilamellar optical image converting tube, such as that described in French Pat. No. 2 561 441. Said tube is associated with different means for supplying its electrodes at high electrical voltage and with a means for recording the image of the aperture appearing on the screen. The recording device may be, for example, a photographic plate.

The bilamellar image converting tube described in the patent cited above requires use of different high voltage electrical sources of fixed or adjustable values.

2. Description of the Related Art

Refer to FIG. 1 for a perspective drawing of the component arrangement of a prior art electronic camera.

As shown, the tube comprises in succession along axis OZ, a plane photocathode 1 perpendicular to said axis, bordered by a narrow aperture 2 for receiving photons 3 from the phenomena being studied, and which emits electrons 4.

Said tube also comprises a pair of plane electrodes 5 for extracting and accelerating electrons, said electrodes being parallel to the aperture and to axis OZ.

The photocathode 1 is connected to an electrical supply source 14 of continuous high voltage and fixed value of 15,000 VDC, for example, in relation to reference mass M.

Electrodes 5 are electron accelerating electrodes; they are connected to reference mass M.

The beam thus accelerated along axis OZ perpendicular to the photocathode arrives at quadrupolar spatial focusing lens 6, 7. Said lens comprises a first and a second pair of cylindrical electrodes 6, 7 parallel to axis OZ and respectively parallel and perpendicular to aperture 2. The first pair of 6 electrodes in said lens is connected to a constant voltage electrical supply source 15 of approximately +400 VDC, for example. The second pair of electrodes 7 in said quadrupolar lens is connected to a constant high voltage electrical supply source 16 of approximately −400 VDC, for example. The camera also comprises a temporal focusing lens consisting of at least a first, a second and a third pair of electrodes 8, 9A, 9B, 10. One electrode 9A of the second pair is connected to an adjustable high voltage source 17 of, for example, between 0 and −10 000 VDC. One electrode 9B of said second pair is connected to a high voltage, adjustable electrical source 18, for example, between 0 and −10,000 VDC. Said pair of electrodes 9A–9B comprises means for deflecting the beam onto screen 11. The first and third pairs of electrodes 8, 10 are connected to reference mass M. In this known type of camera, electrodes 9A–9B are deflection electrodes. They are also connected to fixed value electrical voltage sources 19, 20 by a deflection regulating means 21.

A screen 11 displays image 12 from the aperture

Devices 13 for recording image 12 from the aperture onto screen 11 are associated with this prior art camera. Said recording devices may consist of a photographic plate 13, for example.

The functioning of this prior art camera will now be described in a succinct manner; photocathode 1 emits electrons into a zone defined by aperture 2, said electrons being produced by the impact of photons 3 on said photocathode. These electrons are accelerated by the pair 5 of acceleration electrodes. the electrodes of the first pair 6 of the quadrupolar lens allow the image to be captured through the aperture on temporal plane yoz. The electrodes of the second pair 7 of said quadrupolar lens are for spatial representation through the aperture onto plane XOZ parallel to the aperture and perpendicular to the photocathode. Electrodes 6 of the quadrupolar lens cause the beam to diverse; it is refocused by means of electrodes 8, 9A–9B, 10 of the temporal focusing lens. Electrodes 9A–9B cause temporal deflection of the beam onto plane YOZ.

An ultra rapid electronic camera using the tube of FIG. 1 and which utilizes both fixed and adjustable voltage value sources has one important disadvantage: when one wishes to study a light phenomena, one must pre-adjust the high voltage furnished by the adjustable sources before studying the phenomena, these high voltages being measured by a means temporarily connected to the source outlets during adjustment. The voltage measurement devices are then disconnected and study of the phenomena may begin; thereafter, it is impossible to alter the voltage adjustment values during the course of the experiment. It is also impossible to monitor the voltage values supplied to different electrodes constantly throughout the experiment because the measurement devices are disconnected once voltage regulation has been accomplished. Furthermore, the prior art tube used in this camera has no electrode for temporal prefocusing in front of the quadrupolar lens, thereby detracting from the camera's performance.

SUMMARY

The object of the invention is to overcome these disadvantages and particularly to achieve an ultra rapid digitally controlled electronic camera for the study of very brief light phenomena. It is possible not only to alter the values of the voltages furnished by adjustable sources, but also to measure the voltage values before and during the experiment. Furthermore, the camera which is the subject of the invention allows voltage regulation and measurement to take place at a distance from the tube,.which is often situated in a hostile environment and inaccessible during the experiment. Finally, this camera utilizes a tube with temporal prefocusing electrodes to enhance its performance.

The invention is an ultra rapid digitally controlled electronic camera for the study of very brief light phenomena, comprising a bilamellar optical image conversion tube. The tube comprises in succession along axis OZ, a plane photocathode perpendicular to the axis, defined by a narrow aperture for receiving photons from the phenomena being studied and which emits electrons, a pair of plane electrodes parallel to the said aperture and to said axis for electron acceleration, a quadrupolar spatial focusing lens comprising a first and a second pair of cylindrical electrodes respectively parallel and perpendicular to the said aperture and parallel to said axis. Further, there is a temporal focusing lens comprising at least a first, a second and a third pair of electrodes parallel to the said aperture and to said axis, a screen for displaying the image of the aperture. The camera further comprises means for recording the image formed on the screen, adjustable electrical supply means whose outlets respectively supply voltage of adjustable value, the source outlets being respectively connected to the first pair of electrodes and to the second pair of electrodes of the quadrupolar lens, to the second and third pairs of electrodes of the temporal focusing lens, an electrical source supplying fixed value voltage at one outlet, said outlet being connected to the photocathode, the first pair of temporal focusing lens electrodes, the pair of acceleration electrodes and the screen being connected to reference mass M. With all the sources being situated near the tube, the invention is characterized by the fact that the tube comprises, between the pair of acceleration electrodes and the spatial focusing lens and along the said axis, a pair of temporal prefocusing electrodes parallel to the axis and to the aperture, and connected to an adjustable voltage source, another pair of shutter electrodes parallel to the axis and to the aperture. One of the electrodes in this pair is connected by a shutter control means to a fixed value voltage source, another of the electrodes of this pair being connected to reference mass M, two deflection plates, parallel to the aperture, situated between the temporal focusing lens and the screen along said axis, said plates being respectively connected to adjustable voltage sources and respectively connected by means of a deflection regulating device, to fixed value voltage sources, with all these sources being located near the tube. The camera further comprises a control unit some distance from at least one tube, to control the means for regulating voltage values furnished by the adjustable voltage sources and to measure the respective voltages applied to the photocathode, to the different electrodes and to the shutter control means and voltage deflection device, said adjustment and measurement means being situated near the tube, the control unit being connected to the adjustment and measurement means by optical devices transmitting regulatory data to the voltage adjustment means. Measurement instructions are transmitted to the measurement means, and the measurement results to the control unit.

According to another characteristic of the invention, the more distant control unit comprises control means for furnishing at the output devices coded digital voltage adjustment data and coded digital measurement instructions. A parallel-series digital conversion means connects to the output devices of the control unit, one output device of said digital conversion means being connected to a first electro-optical converter providing at one output device optical signals corresponding to the coded and multiplexed digital data and instructions. The optical means consists of a transmission fiberoptic connected at one end to the output device of the first electro-optic converter, the adjustment and measurement means comprising a first optoelectronic converter connected at one input device to another extremity of the transmission fiberoptic. It provides at one output device coded digital voltage regulating data and coded digital voltage measurement instructions corresponding to the optic signals received, a digital-analog demultiplexer with output devices respectively connected to the control and source voltage adjustment means, to the output devices of source and voltage measurements. An analog-digital multiplexer is respectively connected at its input device to the output devices of the voltage measurement devices, said output devices providing analog signals of voltage measurement, respectively. A second electro-optic converter is connected to one output device of the analogdigital multiplexer to furnish at one output device, optical signals corresponding to the multiplex and digital measurement signals. The optical means comprises a fiberoptic for measurement receptor, connected at one end to the output device of the second electro-optical converter. The control unit further comprises a second opto-electronic converter connected to another extremity of the fiberoptic receptor, to furnish at one output device multiplexed digital measurement signals. A series-parallel digital conversion means is connected to the output device of the second opto-electronic converter. Some output devices of the series-parallel conversion means furnish, one at a time, the digital voltage measurement signals respectively applied to the photocathode, to the electrodes and to the deflection plates by the deflection control means. The output devices of the series-parallel conversion means are connected to a digital display device for voltage measurement. The output device of the analog-digital multiplexer is also connected to an input device by means of the digital analog multiplexer to regulate the voltage of the adjustable voltage sources.

According to another characteristic of the invention, the control devices of the distant unit are connected to a control unit by means of series-parallel conversion of said unit. This is to control the selection of one of the measurement devices and one of the adjustment devices.

DESCRIPTION OF THE PREFERRED EMBODIMENT

Figure 1:
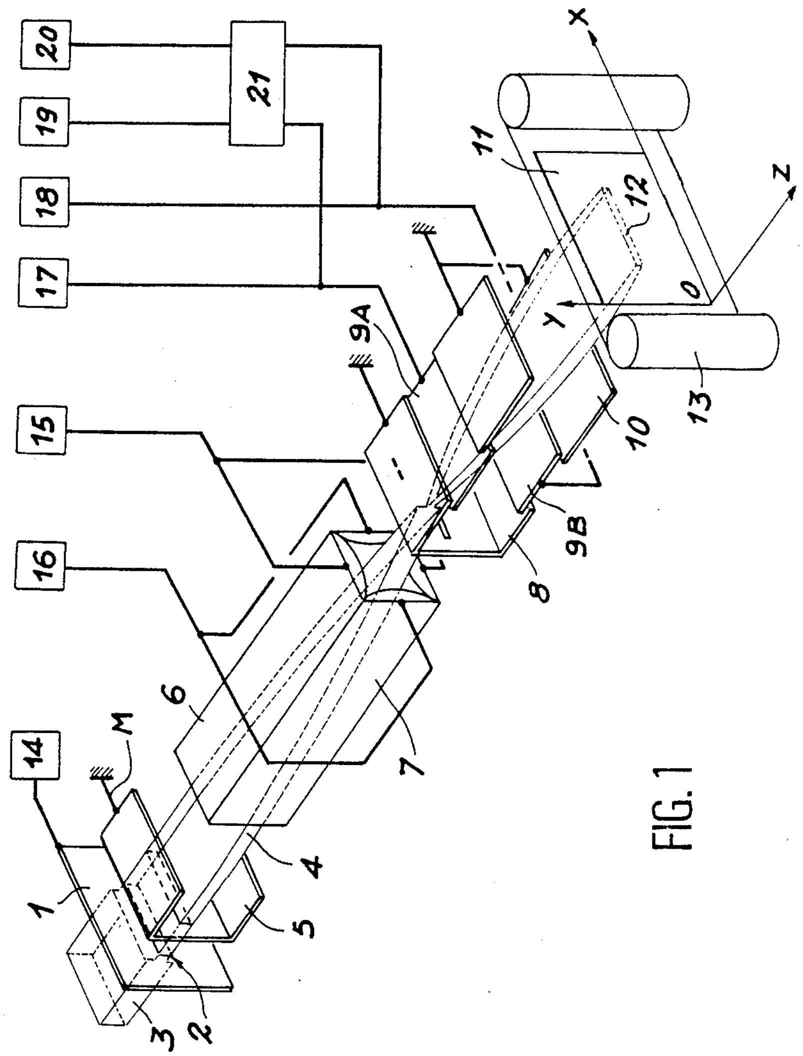
FIG. 1 shows a perspective drawing of the component arrangement for a prior art electronic camera.
Figure 2A:
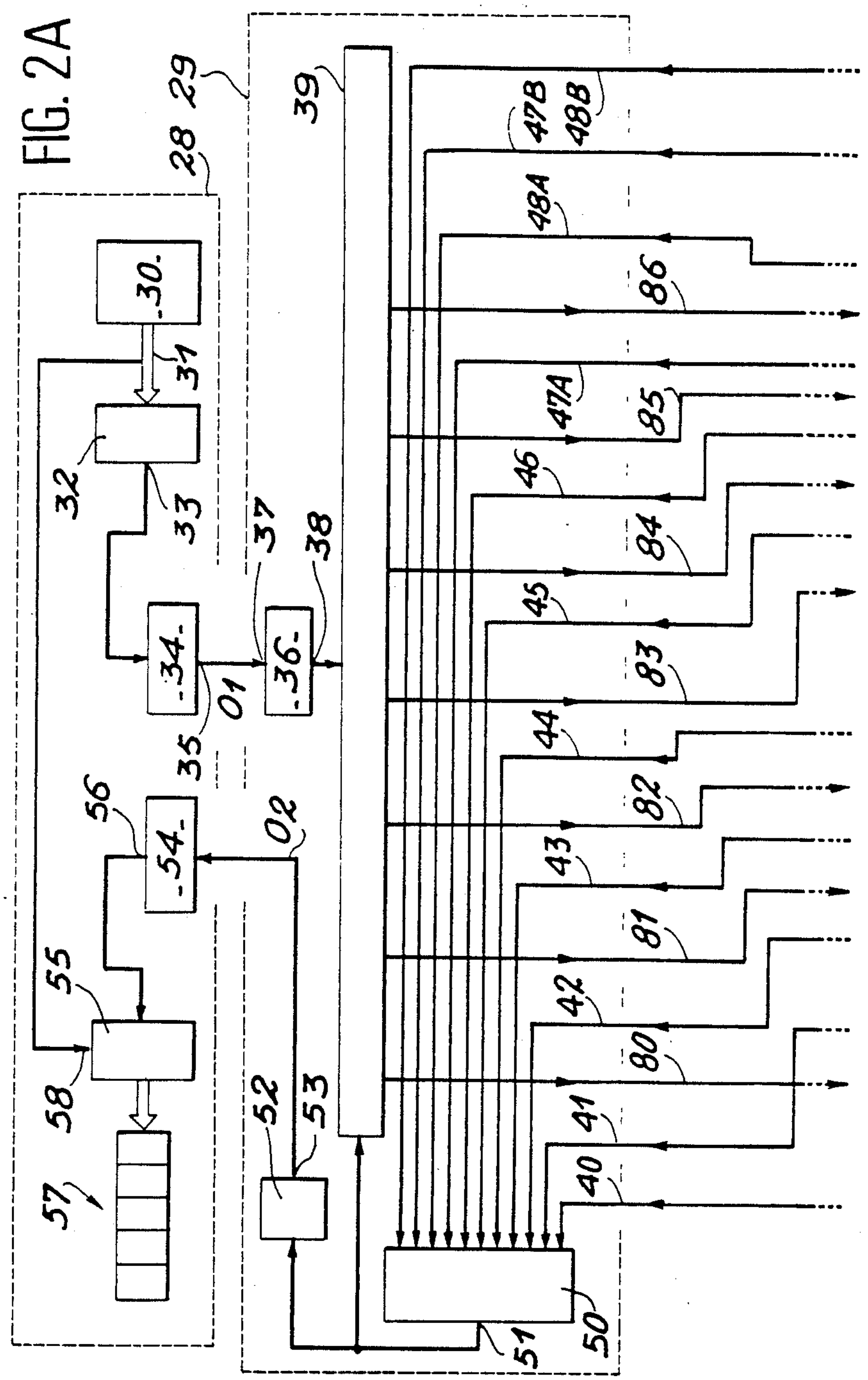
FIG. 2A is a schematic representation of the ultra-rapid electronic camera of this invention.
Figure 2B:
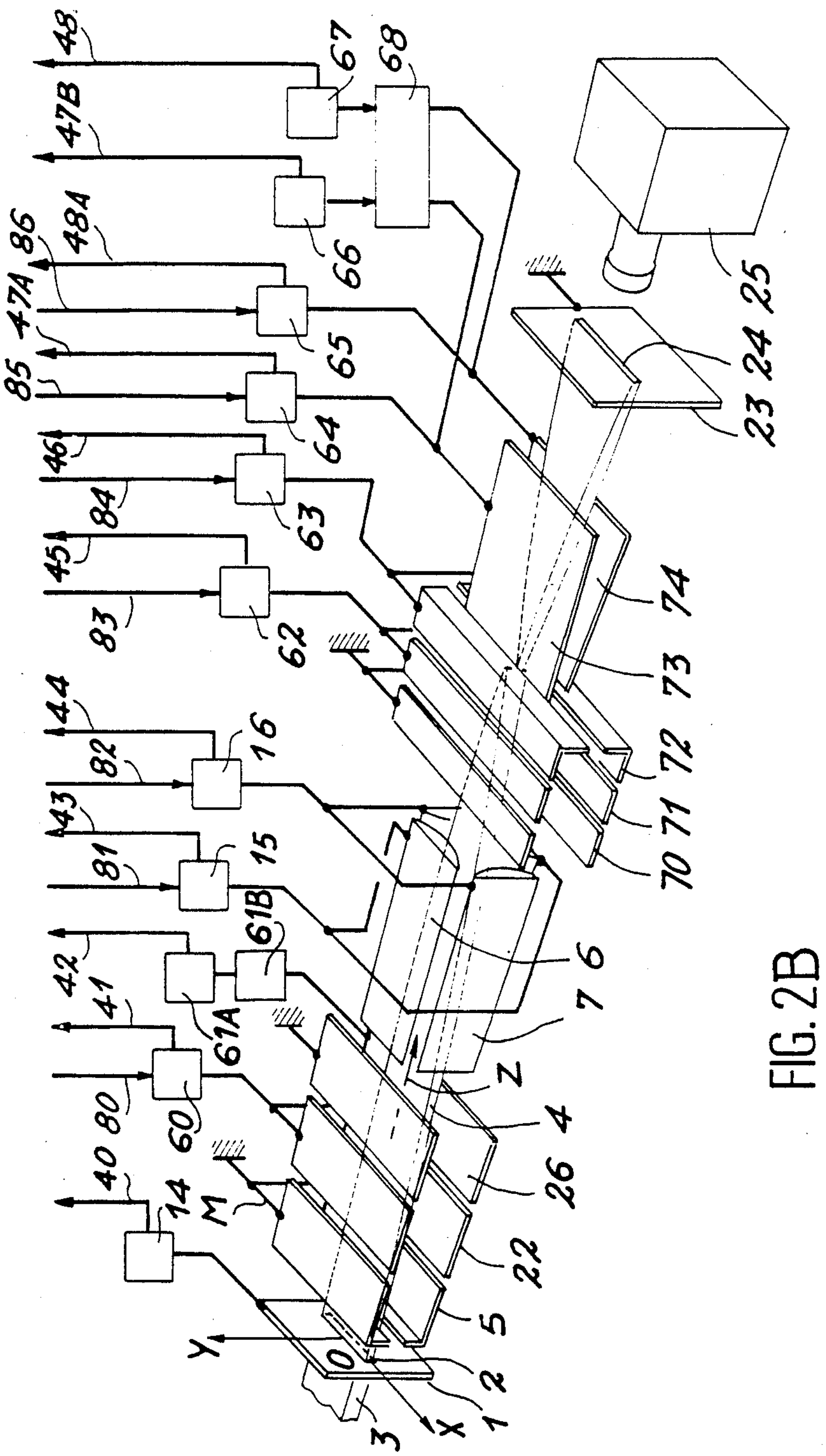
FIG. 2B shows a perspective drawing of the component arrangement for this electronic camera.

The invention's characteristics and advantages will be apparent from the following description. With reference to FIGS. 2A and 2B, they schematically represent an ultra rapid digitally controlled electronic camera according to the invention. FIG. 1 has already been described to illustrate the state of the art. Like elements bear like reference numerals in FIG. 1 and in FIGS. 2A and 2B.

The camera according to the invention and shown schematically in FIGS. 2A and 2B, comprises a bilamellar optical image conversion tube. Different sources of high voltage and recording means 25 are situated near said tube.

The recording means 25 may here comprise a CCD type or charge transfer camera. The camera also comprises, according to the invention, a control unit 28, situated at a distance from the tube. It is controlled control by means of elements 29. Regulation of voltage values is provided by adjustable voltage sources 60, 15, 16, 62, 63, 64, 65. Said control unit, by virtue of regulatory and measurement control means 29, allows regulation of voltage values furnished by adjustable voltage sources 60, 15, 16, 62, 63, 64, 65 and measurement of fixed voltage values provided by voltage sources 14, 61A, 66, 67.

The tube shown in this drawing is an improvement over the tube of FIG. 1. Said improvement consists primarily of the use of a pair of prefocusing temporal electrodes 22 parallel to axis OZ and to the aperture. They are situated along axis OZ, between acceleration electrodes 5 and electrodes 6, 7 of the quadrupolar lens. Because of this prefocusing, there is more light for the camera but no perceptible decline in performance.

The tube of this camera also comprises a pair of supplementary shutter electrodes 26, between prefocusing electrodes 22 and electrodes 6, 7 of the quadrupolar lens. These supplementary electrodes 26 are parallel to the aperture and to axis OZ. Finally, the tube also comprises deflection electrodes or plates 73, 74 independent of the temporal focusing lens. This is not the case with the tube of FIG. 1. These plates are parallel to the aperture and are located along axis OZ, between a temporal focusing lens consisting of first, second and third pairs of electrodes 70, 71, 72 and of screen 23.

Electrodes 70, 71, 72 of the temporal focusing lens are parallel to axis OZ and parallel to the aperture.

The sources of fixed value voltage 14, 61A, 66, 67 are respectively connected to photocathode 1, by a shutter control means 61B. It is connected to one of the shutter electrodes 26, and by deflection control devices 68 which are connected to deflection plates 73, 74. The sources of adjustable voltage 60, 15, 16, 62, 63, 64, 65 are respectively connected to temporal prefocusing electrodes 22, to electrodes 6, 7 of the quadrupolar spatial focusing lens, to the third pair of electrodes 72 of the temporal focusing lens, and to deflection plates 73, 74. Acceleration electrodes 5, one electrode of the pair of stopping electrodes 26, the first electrode 70 of the temporal focusing lens and screen 23 are connected to a reference mass M. The deflection control devices 68, connected to deflection plates 73, 74 deflect the electron beam focused on screen 23.

The control unit 28 is located at a distance from the tube. Voltage regulating and measuring devices 29, as well as the different voltage sources, are located near the tube.

Moreover, one unit may control several voltage adjustment and measurement devices 29 respectively associated with several tubes. Control unit 28 is connected to adjustment and measurement devices 29 by optical means 01, 02. As will be seen later in detail, it transmits regulatory data concerning voltage of the adjustable voltage sources and measurement instructions by means of voltage measurement. The optical means also allows transmission of measurement results to the control unit. Said optical means may comprise, for example, fiberoptics.

Distant control unit 28 comprises a control device 30 which provides coded digital data concerning voltage adjustment at output devices 31. Further, it supplies coded digital instructions regarding measurement of the voltages applied by the sources, to the photocathode, the electrodes and, by virtue of the deflection control means 68, to deflection plates 73, 74. Said digital control devices 30 may comprise, for example, a keyboard for providing data and digital instructions. They may also comprise a microcomputer associated with a bank of data and instructions.

The unit further comprises a parallel-series converter 32, connected to the output devices of control unit 30. Said converter with parallel input devices and series output devices furnishes the data and instructions in series at one output device 33. This output device is connected to an inlet of a first electro-optic converter 34. This furnishes optic signals at one output device 35 corresponding to the coded data and digital instructions, which it must transmit. The optic means consists of a fiberoptic emitter 01, which is connected at one end to output device 35 of the first electro-optic converter 34. Said optic devices also comprise a second fiberoptic converter 52 and a second receptor fiberoptic 02, which will be described in detail later. The voltage adjustment and measurement control devices 29 comprise a first opto-electronic converter 36, which is connected by an input device 37, to another extremity of transmitting fiberoptic 01. Said first opto-electronic converter furnishes the coded digital data concerning voltage adjustment at one output device 38 and the coded digital instructions concerning voltage measurement, corresponding to the optical signals received.

The measurement and adjustment device 29 also comprises a digital-analog demultiplexer 39 having output devices 80, 81, . . . , 86 respectively connected to the input devices of the adjustable voltage sources 60, 15, 16, 62, 63, 64, 65. The demultiplexer 39 also comprises an input device connected to an output device 51 of a digital-analog multiplexer 50. Said multiplexer 50 is connected respectively at the input devices to analog output devices 40, 41, 42, 43, 44, 45, 46, 47A, 48A, 47B, 48B for measuring the respective voltage sources 14, 60, 61A, 16, 15, 62, 63, 64, 65, 66, 67. It is assumed that each source comprises a circuit furnishing an analog signal representing the voltage provided by said source. The output device 51 of the digital-analog multiplexer 50 furnishes the digital values of voltage measurements. Said output device 51 is also connected to the second electro-optic converter 52, which provides at one output device 53 optic signals corresponding to the multiplex digital signals of voltage measurements of the different sources. Output device 51 is also connected, as indicated above, to an input device by means of digital-analog multiplexer 39. This controls the adjustment of voltage of the adjustable voltage sources.

Control unit 28 further comprises a second opto-electronic converter 54, connected to another end of receptor fiberoptic 02. At one output device said second converter 54 furnishes multiplex digital voltage measurement signals. A series-parallel conversion means 55 is connected to output means 56 of the second converter 54. The output devices of conversion means 55 sequentially furnish the digital voltage measurement signals applied to photocathode 1, the electrodes and deflection plates 73, 74 via control means 68. The output devices of conversion means 55 are connected to a digital display means for voltage measurement. One output device of control means 30 is connected to an input device 58 of the conversion means 55 to select whatever measurement is desired from the voltage measurements. Moreover, said control devices can control voltage regulation and measurements from the supply sources of other tubes.

For example, to adjust the voltage at source 60 applied to pair 22 of electrodes, one performs the following operations.

The keyboard 30 of control unit 28 allows the operator to select the desired voltage value and the identification code of the supply source 60, as well as the identification code of the tube called, by touching the keypad. This value and these codes are furnished in digital form through output devices 31 of keypad 30. The data and codes are applied to converter 32. The data and codes are transmitted in digital form, the first electro-optic converter 34 transforming them into optic signals applied by fiberoptic 01 to the first opto-electronic converter 36. Output device 38 of said first converter 36 furnishes the data and codes, in digital form, to apply them by means of digital-analog multiplexer 39. Dependent upon the identification code of the tube and the source selected, a corresponding output device 80 of the multiplexer 39 applies an analog adjustment signal corresponding to the voltage value chosen, to the control input device of source 60.

For example, in order to measure and learn the value of voltage effectively applied by a supply source to corresponding electrodes, such as the voltage applied by the output device of source 60 to electrodes 22, one proceeds in the following manner.

Keyboard 30 enables selection of an identification code or an instruction regarding voltage measurement at source 60. This code is transmitted in digital form to converter 32, then being transformed into optical signals by first electro-optic converter 34. These signals are transmitted via fiberoptic 01 to opto-electronic converter 36, which transmits a digital instruction corresponding to the selection code of the measurement circuit at the source selected by means of multiplexer 39. A corresponding output device 41 of said circuit applies to the input device of analog-digital multiplexer 50 an analog signal representing the voltage value at the output of source 60. This analog signal is applied by means of analog-digital multiplexer 50, which furnishes at one output device 51 a digital signal corresponding to the value of the voltage measured. This digital signal is transformed into optical signals by means of second electro-optic converter 52. The optical signals are transmitted by fiberoptic 02 to the second opto-electronic converter 54. This furnishes at its output device 56, the digital value of voltage measured. This digital value is applied by means of series-parallel conversion means 55, whose output devices are connected to display device 57.

The invention achieves all the goals previously mentioned. It has an ability to control from a distance values of voltages applied to different electrodes in the tube, as well as to measure voltage supplied by different sources. This camera is particularly useful when the tube is situated in a hostile environment. The use of fiberoptics and digital signal transmissions eliminates the possibility of any electrical interference with commands or measurements. The values of voltage supplied by the adjustable source may be modified and measured throughout the course of the experiment.

EXAMPLE

By way of an example, the voltage values supplied by the different voltage sources are as follows:

| SOURCE REFERENCE | VOLTAGE VALUE | |
|---|---|---|
| 14 | −15,000 VDC | (FIXED) |
| 60 | −6,130 VDC | (VARIABLE) |
| 61A | +1,500 VDC | (IMPULSE) |
| 15 | +182.5 VDC | (VARIABLE) |
| 16 | −182.5 VDC | (VARIABLE) |
| 62 | −6,530 VDC | (VARIABLE) |
| 63 | −4,770 VDC | (VARIABLE) |
| 64 | −200 VDC | (VARIABLE) |
| 65 | +200 VDC | (VARIABLE) |
| 66 | +1,000 VDC | (IMPULSE) |
| 67 | −1,000 VDC | (IMPULSE) |

We claim:

1. An ultra rapid electronic digitally controlled camera apparatus for the study of very brief light phenomena, comprising a bilamellar optical image conversion tube, said tube comprising in succession along an axis a plane photocathode perpendicular to said axis, defined by a narrow aperture for receiving photons from the phenomena being studied and emitting electrons, a pair of plane electron accelerating electrodes parallel to said aperture and to said axis, a quadrupolar spatial focusing lens comprising a first and a second pair of mutually parallel cylindrical electrodes perpendicular to said aperture and parallel to said axis;
   a temporal focusing lens comprising at least a first, a second and a third pair of electrodes parallel to said aperture and to said axis, a screen for forming an image from the aperture, the camera further comprising a means for recording the image formed on the screen;
   a plurality of adjustable electrical sources respectively supplying adjustable voltage values at their outlets, said source outlets being respectively connected to the first pair of electrodes and to the second pair of electrodes of the quadrupolar lens, to the second and third pairs of electrodes of the temporal focusing lens;
   an electrical supply source providing fixed value voltage at one outlet, said outlet being connected to the photocathode, the first pair of electrodes of temporal focusing lens, the pair of accelerating electrodes and the screen being connected to a reference mass, all the sources being situated near the tube, characterized in that the tube comprises, between the pair of acceleration electrodes and spatial focusing lens and along said axis, a pair of temporal prefocusing electrodes parallel to the axis and to the aperture and connected to an adjustable value voltage source;
   a second pair of acceleration electrodes parallel to the axis and to the aperture, one of the electrodes of the second pair being connected by a shutter control means to a fixed value voltage source, another of the electrodes of the second pair being connected to a second reference mass, a pair of deflection plates parallel to the aperture, situated between the temporal focusing lens and the screen along said axis;
   said pair of deflection plates being respectively connected to a pair of adjustable value voltage sources and respectively connected by a deflection control means, to a pair of fixed value voltage sources, all the sources being situated near the tube, the camera further comprising a control unit distant from at least one tube, to control a means of regulating values of voltage furnished by the sources of adjustable voltage and the respective measurements of voltage applied to the photocathode to the different electrodes and to the shutter control and deflection control devices, said adjustment and measurement means being situated near the tube; and the control unit being connected to the adjustment and measurement devices by a pair of optic devices transmitting regulatory data to the voltage control devices and measurement instructions to the measurement devices, and transmitting measurement results to the control unit.

2. The camera apparatus according to claim 1, wherein the distant control unit comprises a control means for furnishing at its output devices coded digital data on voltage regulation and coded digital measurement instructions;

a series-parallel digital conversion device connected to the output devices of the control unit, one output device of said digital conversion device being connected to a first electro-optic converter furnishing at one output device optical signals corresponding to the coded multiplex digital instructions, said optic devices comprising a transmission fiberoptic connected at one end to the output device of the first electro-optic converter;

the regulation and measurement means comprising a first opto-electronic converter connected at one input device to the other end of the transmitting fiberoptic and furnishing at one output device coded digital data regarding voltage adjustment and coded digital instructions regarding voltage measurement corresponding to the optic signals received;

a digital-analog multiplexer with a plurality of output devices respectively connected to the input devices controlling voltage adjustment of the adjustable voltage sources;

a second analog-digital multiplexer respectively connected at its input devices to a plurality of output devices of the voltage sources, said output devices respectively furnishing analog signals of voltage measurements, said analog-digital multiplexer furnishing at one output device digital multiplex signals of voltage measurement;

a second electro-optical converter connected to the output device of the analog-digital multiplexer to furnish at one output device, optic signals corresponding to the multiplex digital measurement signals;

the optic means comprising a measurement receptor fiberoptic, connected at one end to the output device of the second electro-optic converter, the control unit further comprising a second opto-electronic converter connected to another end of the receptor fiberoptic to furnish at one output device the digital multiplex measurement signals;

a digital series-parallel conversion device connected to the output device of the second opto-electronic converter;

a plurality of output devices of the series-parallel conversion means furnishing one at a time the digital measurement signals from the respective measurements of voltage applied to the photocathode, to the electrodes, and to the shutter control and the deflection means; and the output devices of the series-parallel conversion means being connected to a digital display means for voltage measurement, the output device of the analog-digital multiplexer also being connected to said input device of the digital-analog multiplexer to control voltage regulation at the sources of adjustable value voltage.

3. The camera apparatus according to claim 2, wherein the control devices of the distant unit are connected to one input device of the series-parallel conversion device of said unit, to control the selection of said tube, a measurement means and an adjustment means.

* * * * *